(12) United States Patent
Sellers et al.

(10) Patent No.: US 7,393,152 B2
(45) Date of Patent: Jul. 1, 2008

(54) CONE ADAPTOR FOR BALL JOINT STUDS, TIE RODS, SWAY BAR LINKS AND THE LIKE

(75) Inventors: Roger G. Sellers, Arnold, MO (US); Norman F. Curtis, Cottleville, MO (US); Yanjun Xue, Peoria, IL (US); George R. Schmidt, St. Louis, MO (US); Scott Warhover, St. Charles, MO (US); Thomas J. Byrnes, St. Charles, MO (US)

(73) Assignee: Federal Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 11/533,186

(22) Filed: Sep. 19, 2006

(65) Prior Publication Data

US 2007/0065227 A1    Mar. 22, 2007

Related U.S. Application Data

(60) Provisional application No. 60/718,708, filed on Sep. 20, 2005.

(51) Int. Cl.
F16C 11/08    (2006.01)
(52) U.S. Cl. .................. 403/135; 403/77; 403/133; 403/368
(58) Field of Classification Search ............. 403/76, 403/77, 122, 133, 134, 135, 365, 367, 368; 280/93.511
See application file for complete search history.

(56) References Cited

U.S. PATENT DOCUMENTS

| | | | |
|---|---|---|---|
| 68,581 A | 9/1867 | Squier | |
| 1,153,986 A | 9/1915 | Whitney | |
| 1,854,938 A | 4/1932 | Jantsch | |
| 2,062,290 A * | 12/1936 | Bott | ......................... 403/368 |
| 2,309,746 A | 2/1943 | Bone | |
| 2,771,300 A * | 11/1956 | Latzen | ......................... 403/77 |
| 2,908,507 A | 10/1959 | Blanks, Sr. et al. | |

(Continued)

FOREIGN PATENT DOCUMENTS

WO    WO 03/031833 A2    4/2003

*Primary Examiner*—Daniel P. Stodola
*Assistant Examiner*—Michael P. Ferguson
(74) *Attorney, Agent, or Firm*—Robert L. Stearns; Dickinson Wright PLLC

(57) ABSTRACT

A ball joint assembly (28) for a vehicular steering or suspension application includes a cap-like housing (42) in which is captured the articulating ball portion (32) of a stud (30). A shank (34) extends from the ball portion (32), outwardly from the housing cap (42), to provide a connection and anchoring interface for the suspension member (16) or other anchoring component. The connection interface with the anchoring suspension member (16) is characterized by a specially designed surface which is convenient to machine, provides increased surface-to-surface contact area, and provides additional advantages such as improved stress distribution and NVH benefits. A washer-like cone adaptor (54) mates with a specially formed adaptor interface region (48) on the stud (30). On its outer surface, the adaptor (54) has a broad tapering feature (56) designed to seat in a complementary-shaped receiving flare (58) in the anchoring suspension member (16). The mating contact region between the adaptor (54) and the stud (30) is formed with spherical or spheroidal curvatures, or by single or multiple step configurations.

5 Claims, 5 Drawing Sheets

U.S. PATENT DOCUMENTS

| | | |
|---|---|---|
| 3,039,786 A | 6/1962 | Punches |
| 3,180,655 A * | 4/1965 | Gerner .................. 280/93.508 |
| 3,563,564 A | 2/1971 | Bartkowiak |
| 3,973,789 A | 8/1976 | Kunz et al. |
| 4,162,859 A * | 7/1979 | McAfee ........................ 403/77 |
| 5,066,159 A | 11/1991 | Urbach |
| 5,175,903 A | 1/1993 | Curtis |
| 5,284,398 A | 2/1994 | Sakai |
| 5,312,200 A | 5/1994 | Buhl et al. |
| 5,492,428 A | 2/1996 | Hellon et al. |
| 5,529,420 A | 6/1996 | Henkel et al. |
| 5,577,854 A | 11/1996 | Jacob et al. |
| 5,615,967 A | 4/1997 | Hellon |
| 5,697,723 A | 12/1997 | Wood |
| 5,927,891 A | 7/1999 | Trumbower et al. |
| 6,010,274 A | 1/2000 | Abouzahr |
| 6,413,003 B1 | 7/2002 | Schmidt et al. |
| 6,527,468 B1 | 3/2003 | Lindquist et al. |
| 7,086,802 B2 * | 8/2006 | Larson et al. ............... 403/122 |
| 2003/0113157 A1 | 6/2003 | Bodin et al. |

* cited by examiner

CONE ADAPTOR FOR BALL JOINT STUDS, TIE RODS, SWAY BAR LINKS AND THE LIKE

CROSS REFERENCE TO RELATED APPLICATIONS

The present application claims priority to U.S. provisional application entitled Cone Adaptor For Ball Joint Studs, Tie Rods, Sway Bar Links And The Like having Ser. No. 60/718,708 and filed on Sep. 20, 2005.

BACKGROUND OF THE INVENTION

1. Field of the Invention

This invention relates to a ball and socket type joint of the type used in vehicular steering and/or suspension applications, and more particularly toward such a ball joint assembly for use in applications where one of the anchoring members, such as a steering knuckle or tie rod for example, is made from a relatively soft material like aluminum.

2. Related Art

Ball joints are typically used in vehicular applications where three-dimensional movement of a wheel, and in particular a steerable wheel, is required when a vehicle is turning and the suspension is accommodating movement over rough terrain. In the normal course of operation, ball joints are subjected to very high stresses. These stresses are transmitted through the stud of a ball joint assembly into the suspension member, which may be a steering knuckle, control arm, steering link, frame member or other feature.

The recent emphasis on reducing vehicular weight is driving material selections toward lighter options. Sometimes, there is a motivation to substitute aluminum for traditional cast iron materials, even in the area of chassis and suspension components. Unfortunately, lighter materials are often softer than the heavier materials they replace, and therefore less suited to endure the localized and concentrated stresses which may arise during normal vehicular operations.

FIGS. 9 and 10 illustrate two different prior art attempts to accomplish similar functionality for ball joint assemblies, and in particular studs which are intended to be anchored in relatively soft material like aluminum. FIG. 9, in particular, is intended to correspond to the design depicted in U.S. Pat. No. 6,527,468, the entire disclosure of which is hereby incorporated by reference. These designs are either difficult to produce on a high volume basis, or result in unacceptable attributes such as NVH issues and provide less surface-to-surface contact in the interface regions. By contrast, the subject invention as depicted in various embodiments in FIGS. 1-8, overcomes some or all of these issues and represents a significant improvement over prior art constructions.

Accordingly, there is a need for an improved method of interconnecting a ball joint assembly to vehicular steering and suspension features to accommodate the anchor points being made from a softer material.

SUMMARY OF THE INVENTION

The subject invention comprises a ball and socket joint assembly of the type used in vehicular steering and suspension applications in which an anchoring and control member is made from relatively soft material. The assembly comprises a stud having a ball portion on one end thereof and a shank extending therefrom. The shank includes a thread form for attaching the stud to an anchoring control member made from a relatively soft material. The shank includes an adaptor interface region between the ball portion and the thread form.

An annular, loose piece adaptor is slidably disposed on the shank and matingly engages the adaptor interface region in abutting surface-to-surface contact therewith. The adaptor has a frustoconical exterior surface tapering inwardly toward the thread form, and an interior surface. The interior surface of the adaptor includes a generally spheroidal female surface configuration and the adaptor interface region of the shank has a complementary-shaped generally spheroidal male surface configuration. The generally spheroidal female and male mating surfaces provide enhanced stress distributions and load carrying capabilities with less adaptor-to-shank slippage in operation.

According to another aspect of the invention, a ball and socket joint assembly is provided of the type used in vehicular steering applications in which an anchoring control member is made from relatively soft material. A stud has a ball portion on one end thereof and a shank extending therefrom. The shank includes a thread form for attaching the stud to an anchoring control member made from a relatively soft material. The shank includes an adaptor interface region between the ball portion and the thread form. An annular, loose piece adaptor is slidably disposed on the shank and matingly engages the adaptor interface region in abutting surface-to-surface contact therewith. The adaptor has a frustoconical exterior surface tapering inwardly toward the thread form, and an interior surface. The interior surface of the adaptor includes a generally cylindrical major side wall establishing a major inside diameter thereof and a generally cylindrical minor side wall, concentric with the major side wall, establishing a minor inside diameter thereof. The interior surface of the adaptor also includes at least one annular shoulder between the major and minor side walls. The adaptor interface region of the shank includes a generally cylindrical major shaft matingly received with the major side wall of the adaptor, a minor shaft matingly received within the minor side wall of the adaptor, and at least one annular shoulder between the major and minor shafts. The shoulder of the adaptor is pressed in face-to-face contact with the shoulder of the shank.

Both aspects of the invention as set forth herein overcome the shortcomings and disadvantages present in prior art designs, by providing an improved construction for interconnecting a ball joint assembly to a vehicular steering and/or suspension feature to accommodate anchor points made from a softer material.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
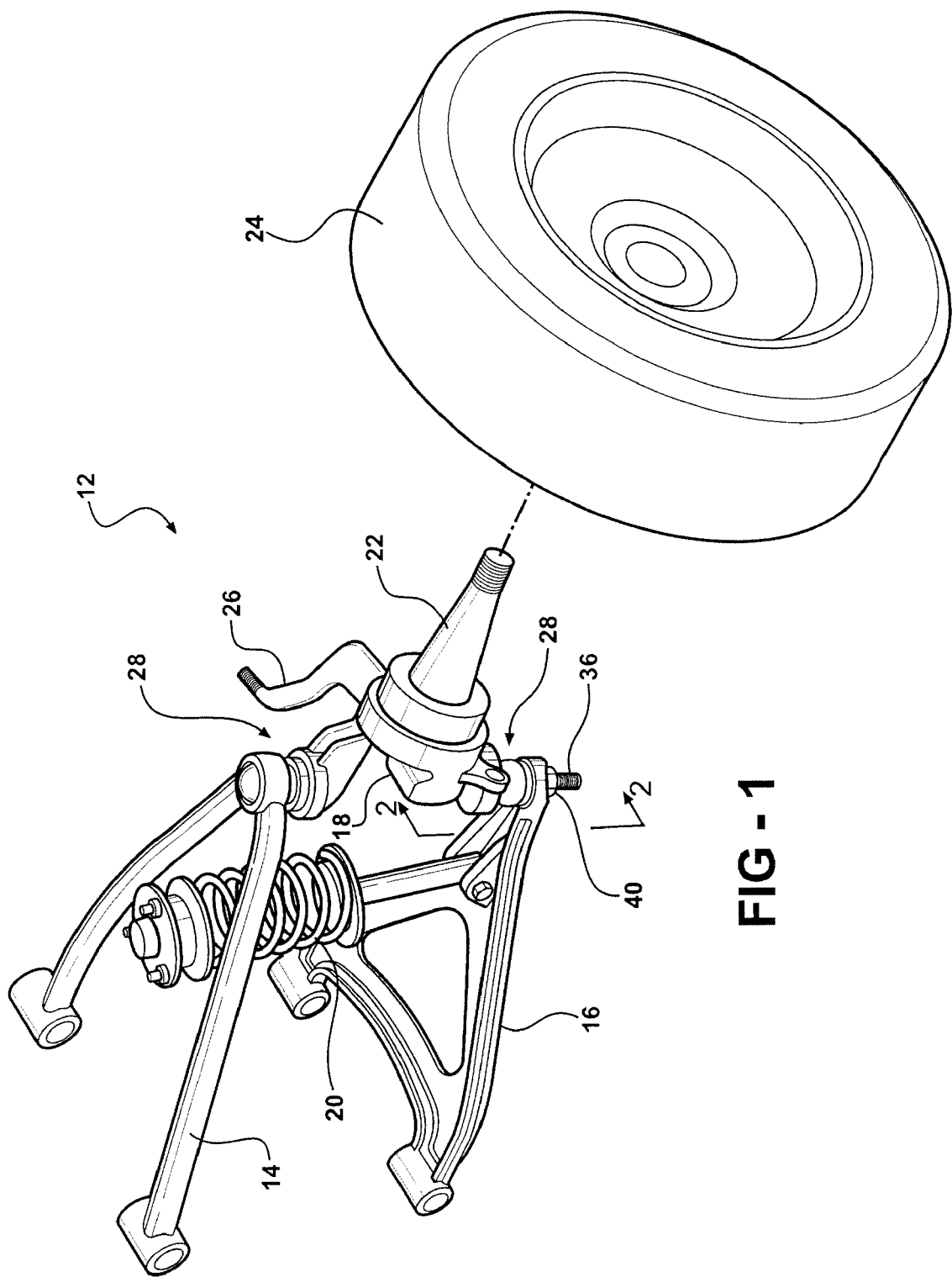
FIG. 1 is a perspective view of an exemplary application for the subject ball and socket joint assembly wherein the steering knuckle is supported between upper and lower control arms made from a relatively soft material such as aluminum.

Referring to the Figures, wherein like numerals indicate like or corresponding parts throughout the several views, a vehicular steering and suspension assembly such as used in the front, dirigible wheels of a motor vehicle is generally shown at 12 in FIG. 1. Although the front suspension system 12 is shown here comprising upper 14 and lower 16 control arms interconnecting a steering knuckle 18, it will be appreciated by those of skill in the art that the contemplated invention may find application in other steering and/or suspension components. For example, the invention, as will be described in multiple embodiments, may be deployed in not only steering knuckles and control arm interfaces, but also in steering linkages, frame member connections, and other articulating features.

Returning to the illustrative application depicted in FIG. 1, a suspension system 12 is shown including a combined spring and dampening device 20 interconnecting the lower control arm 16 to interposing portions of the vehicle chassis or frame (not shown). The steering knuckle 18 includes a spindle 22 upon which a vehicular wheel assembly 24 is mounted, together with appropriate braking and bearing components as is well known to those of skill in this art. A steering arm 26 extends transversely from the steering knuckle 18, ready to connect with an appropriate steering link (not shown). Although purely depicted for its illustrative value in FIG. 1, the steering suspension system 12 in this example includes components made from relatively soft material such as aluminum or other light-weight materials or alloys, as compared with the traditional steel and cast iron constructions. For example, the lower control arm 16 in this example is made from aluminum or an aluminum alloy having material properties and characteristics which are softer and more ductile than traditional iron and steel constructions. The suspension system 12 includes, in this example, a pair of ball joint assemblies, generally indicated at 28, interconnecting the upper 14 and lower 16 control arms to the steering knuckle 18, respectively.

Figure 2:
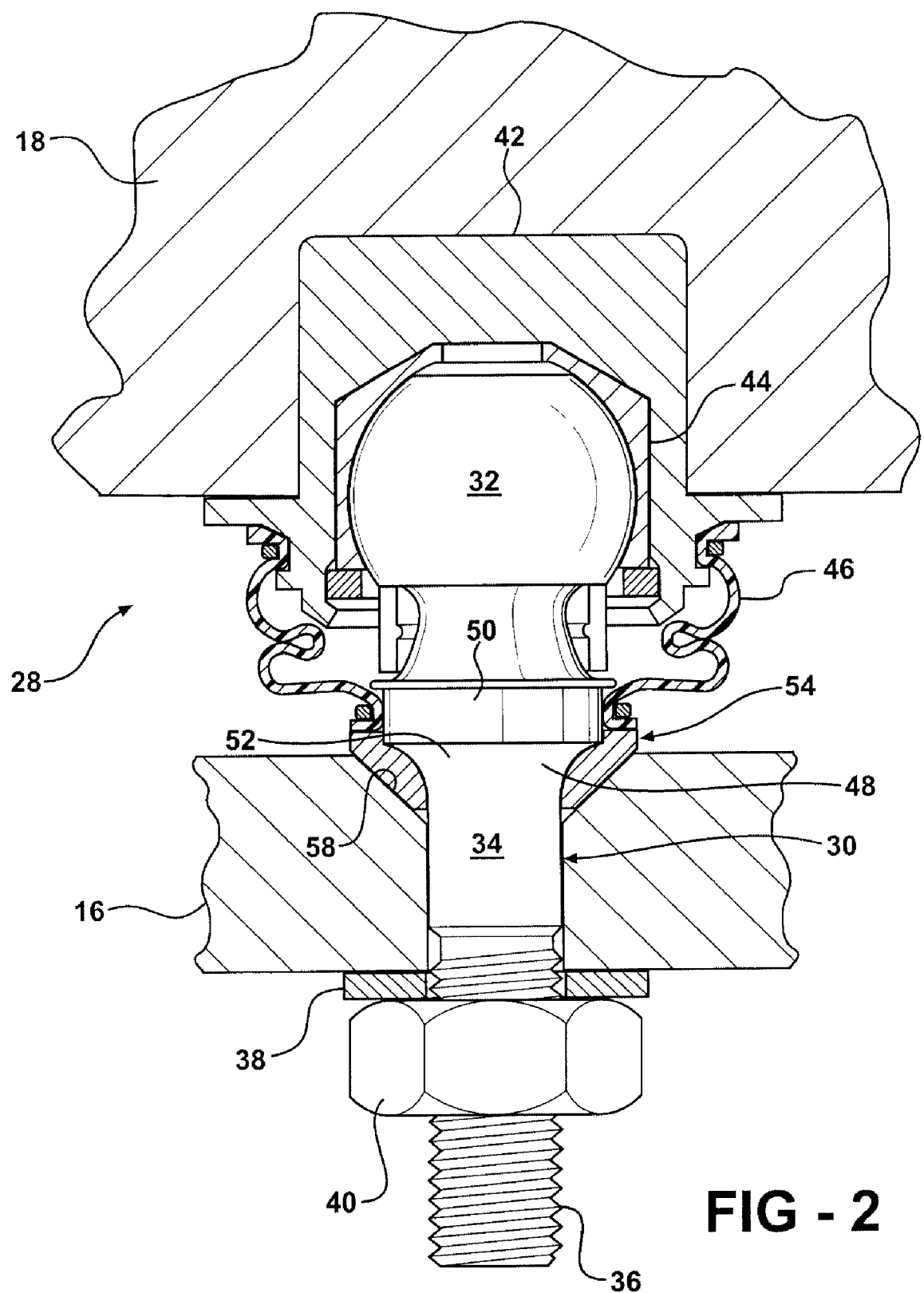
FIG. 2 is a cross-sectional view taken generally along lines 2-2 in FIG. 1.

FIG. 2 represents a cross-sectional view of the ball joint assembly 28 as taken through the lower control arm 16. Here, the ball joint assembly 28 is shown including a stud, generally indicated at 30, having a ball portion 32 at one end thereof. A shank 34 extends from the ball portion 32, and includes a thread form 36 for attaching the stud 30 to an anchoring control member made from a relatively soft material, which in this case is the lower control arm 16. A washer 38 and nut 40 are advanced onto the thread form 36 for establishing the requisite tensile stress through the stud 30 to maintain a secure connection to the lower control arm 16 in use.

A housing cap 42 surrounds the ball portion 32 of the stud 30 for providing an articulating interface therewith. The housing cap 42, while shown in but one purely exemplary configuration in FIG. 2, is seated via a press fit operation into a corresponding receiving pocket in the steering knuckle 18. A polymer liner 44 may, in some circumstances, be interposed between the housing cap 42 and the ball portion 32 as a bearing surface. A resilient dust boot 46 is shown extending between the housing cap 42 and the shank 34 for preventing contaminant infiltration into the articulating interface. Of course, many other constructions and designs of the housing cap 42 and other components such as the dust boot 46 may be implemented in conjunction with the novel features of this invention. It is necessary only that the housing cap 42 complement the ball portion 32 and thereby provide a full articulating joint which facilitates the three-dimensional movement necessary to accommodate wheel turning, suspension travel, and other mechanical linkage movements.

Figure 4:
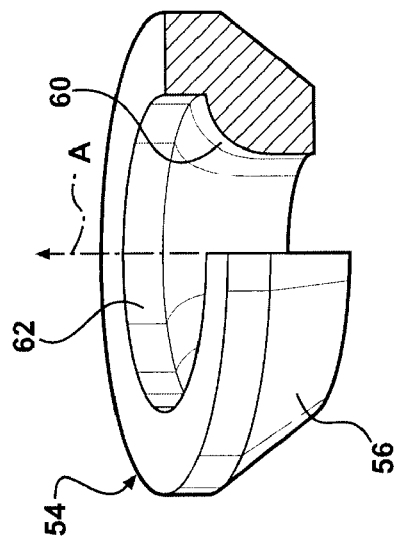
FIG. 4 is a perspective view of the annular, loose piece adaptor shown in quarter section.
Figure 3:
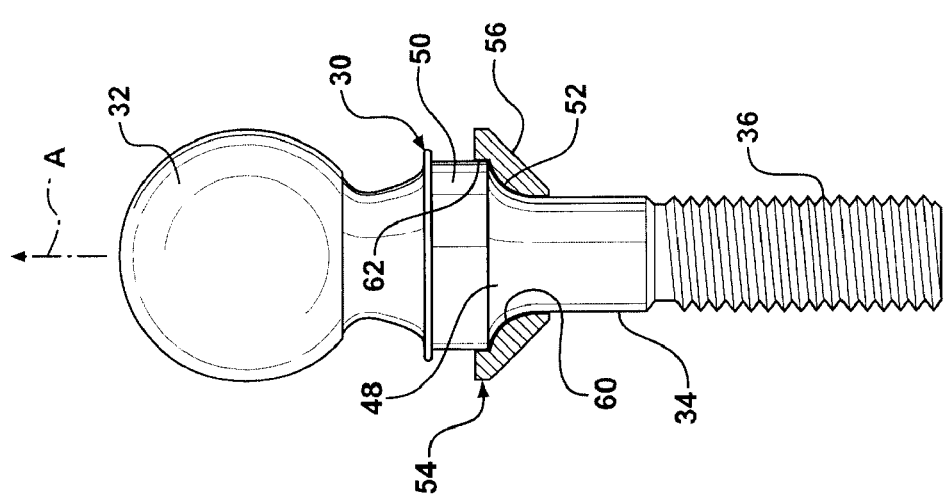
FIG. 3 is a front elevation view of a stud according to the subject invention showing an annular, loose piece adaptor operatively disposed thereon and depicted in cross-section.

Referring now to FIGS. 3 and 4, the stud 30 portion of the ball joint assembly 28 is shown including an adaptor interface region 48 between the ball portion 32 and the thread form 36. An imaginary central axis A is shown as a center-line for the various surface features formed as a body of revolution. The adaptor interface region 48 includes numerous surface features and contours including a generally cylindrical collar 50 which, among other functions, may serve to receive the clamped lower end of the dust boot 46, as depicted in FIG. 2. In addition, the adaptor interface region 48 includes a generally spheroidal male surface configuration 52 formed in the concave direction. Thus, the spheroidal male surface configuration 52 takes the appearance of an enlarged fillet transitioning the collar 50 down toward the thread form 36.

The adaptor interface region 48 of the shank 34 is designed to receive an annular, loose piece adaptor, generally indicated at 54. The adaptor 54 is slidably disposed over the shank 34 and matingly engages the adaptor interface region 48 in abutting surface-to-surface contact therewith. The adaptor 54 has a frustoconical exterior surface 56 tapering inwardly toward the thread form 36. Thus, as shown in FIG. 2, the frustoconical exterior surface 56 of the adaptor 54 seats within a complementary shaped flare 58 in the lower control arm 16. The relatively shallow taper presented by the frustoconical exterior surface 56 of the adaptor 54 accommodates a distribution of loading stresses over a wider area of the lower control arm 16. This thereby reduces the pressure applied to the anchoring lower control arm 16 via the tightened nut 40. By reducing the contact pressure in this manner, the use of softer material such as aluminum and alloys thereof for the lower control arm 16, or other suspension member or linkage, can be enabled.

The adaptor 54 also includes an interior surface, opposite the frustoconical exterior surface 56, which is characterized in this embodiment by a generally spheroidal female surface configuration 60. The spheroidal female configuration 60 complements the spheroidal male configuration 52 of the shank 34 and establishes an abutting surface-to-surface contact therewith. The spheroidal female configuration 60 is shown in the convex direction, and cooperates together with the mating male surface to provide enhanced stress distributions and load carrying capabilities for the ball joint assembly 28. The spherical or spheroidal surface curvatures also facilitate less adaptor-to-shank slippage in operation. The surface configurations are conducive to manufacturability, and also provide other benefits such as enhanced NVH characteristics and the like. The interior surface of the adaptor 54 further includes a generally cylindrical side wall 62 adjacent its generally spheroidal female surface configuration 60. The side wall 62 matingly receives a lower portion of the collar 50 of the shank 34, and provides enhanced seating and radial stress distributions between the two components.

Figure 5:
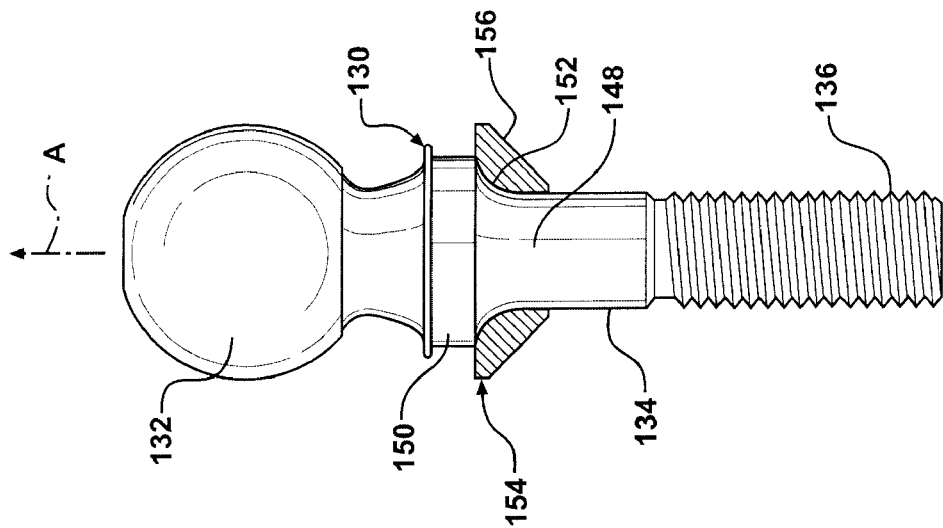
FIG. 5 is a view as in FIG. 3 but depicting a first alternative embodiment of the geometric surface formations between the female and male mating surfaces of the stud and the adaptor.

Referring now to FIG. 5, a first alternative embodiment of the subject invention is depicted, wherein like or corresponding parts are depicted using the same reference characters with the prefix "1." In this embodiment, the adaptor 154 is identical in every respect to that described previously in connection with the preferred embodiment, but the side wall 62 is omitted. In this case, the spheroidal female configuration 60 receives 100% of the axial and radial loading vectors between the adaptor 154 and the stud 30. In some applications, this design may be preferred.

Figure 6:
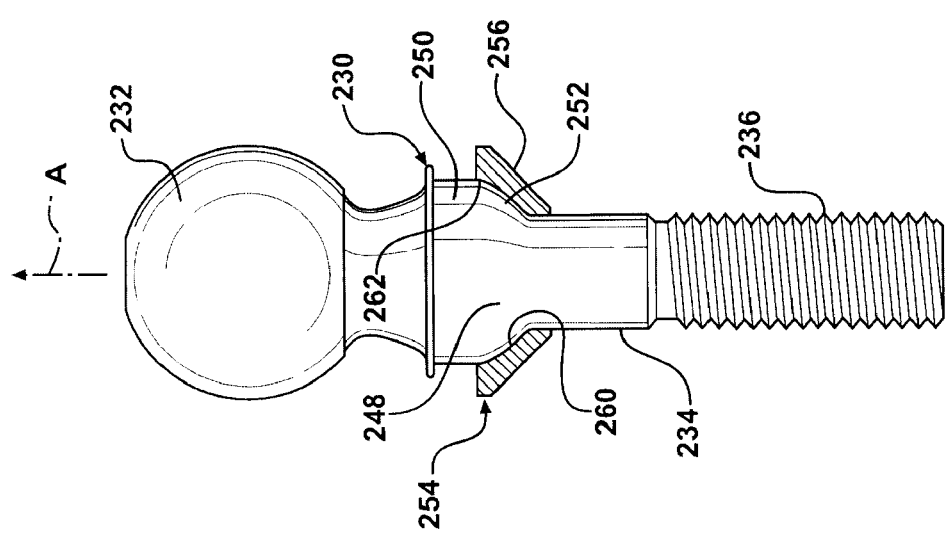
FIG. 6 is a view as in FIG. 3 but showing a second alternative embodiment for the mating interface between the stud and adaptor.
Figure 10:
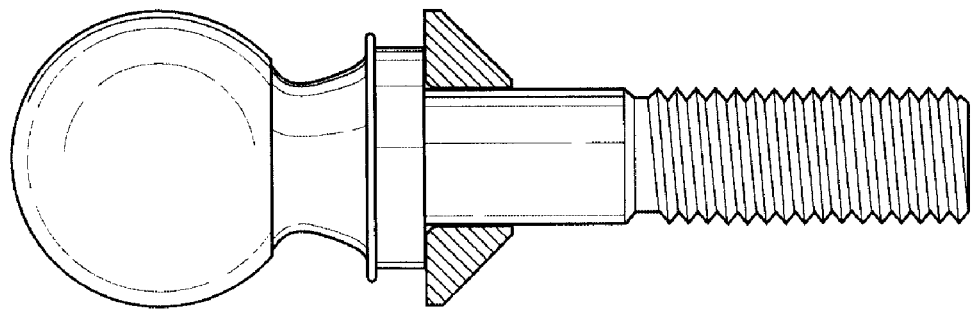
FIG. 10 is another depiction of a prior art stud and adaptor configuration.
Figure 9:
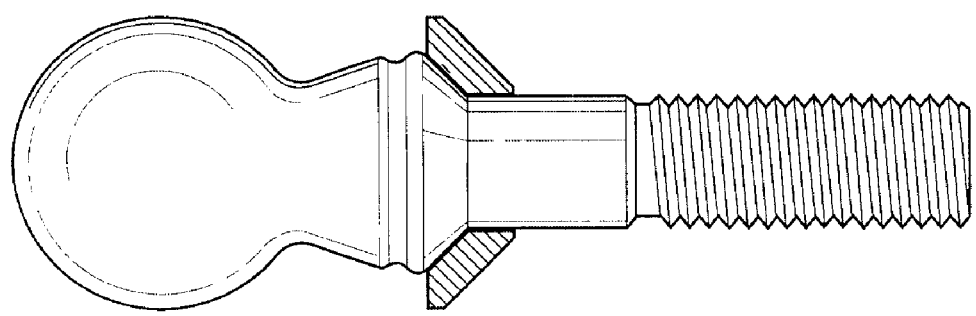
FIG. 9 is a depiction of a prior art style stud and adaptor configuration.

Turning now to FIG. 6, a second alternative embodiment of the subject invention is depicted, wherein like or corresponding parts to those described above are indicated using the same reference numerals together with the prefix "2." In the embodiment of FIG. 6, the interior surface of the adaptor 254 is characterized by the generally spheroidal female surface configuration 260 having a generally concave formation, whereas the mating, generally spheroidal, male surface configuration 252 on the adaptor interface region 248 has a generally convex formation. Thus, it can be seen that FIG. 6 represents a mere reversal of concave and convex features in the surface contact regions between the adaptor 254 and the adaptor interface region 248. Accordingly, similar performance characteristics can be expected.

Figure 7:
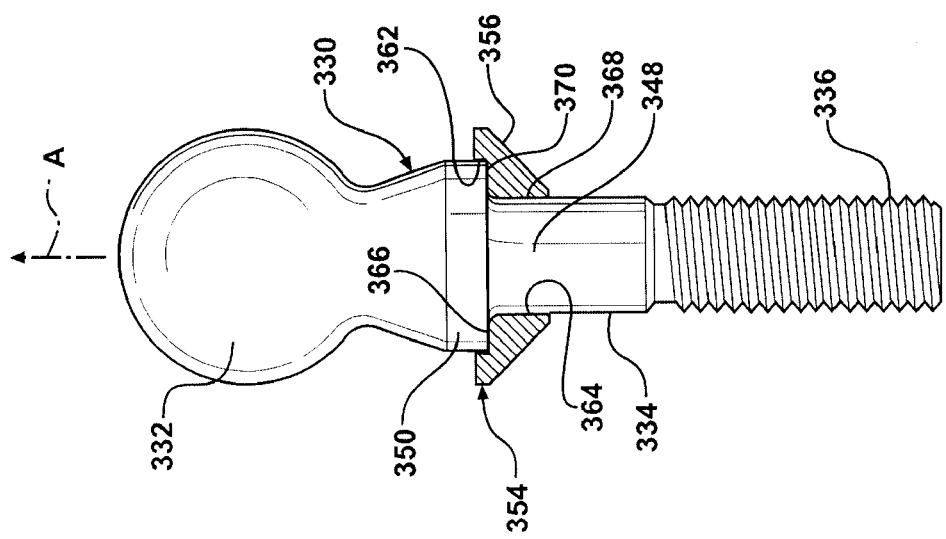
FIG. 7 is a view as in FIG. 3 but depicting a third alternative embodiment of the adaptor interface region.

In FIG. 7, a third alternative embodiment of the subject invention is depicted. In this example, like or corresponding parts to those previously presented are shown with like reference numerals preceded by the prefix "3." In this example, generally spheroidal interface surfaces between the adaptor 354 and the adaptor interface region 348 are substituted with one or more step configurations. A single step configuration is illustrated in FIG. 7, wherein the interior surface of the adaptor 354 includes a generally cylindrical major side wall 362 establishing a major inside diameter. A generally cylindrical minor side wall 364, concentric with the major side wall 362, establishes a minor inside diameter of the adaptor 354. At least one annular shoulder 366 extends between the major 362 and minor 364 side walls, thereby providing a ledge generally perpendicular to the central axis A. The shoulder 366 therefore establishes a contact surface through which all axially vectored stresses are transferred between the adaptor 354 and the stud 30. The adaptor interface region 348 of the shank 334 includes a generally cylindrical major shaft corresponding to the collar 350. This major shaft is matingly received within the major side wall 362 of the adaptor 354. The adaptor interface region 348 also includes a minor shaft 368 that is matingly received within the minor side wall 364 of the adaptor 354. An annular shoulder 370 extends between the major 350 and minor 368 shafts to establish a generally transverse ledge, relative to the central axis A. The shoulder 370 is adapted to seat in face-to-face contact with the shoulder 366 of the adaptor 354.

Figure 8:
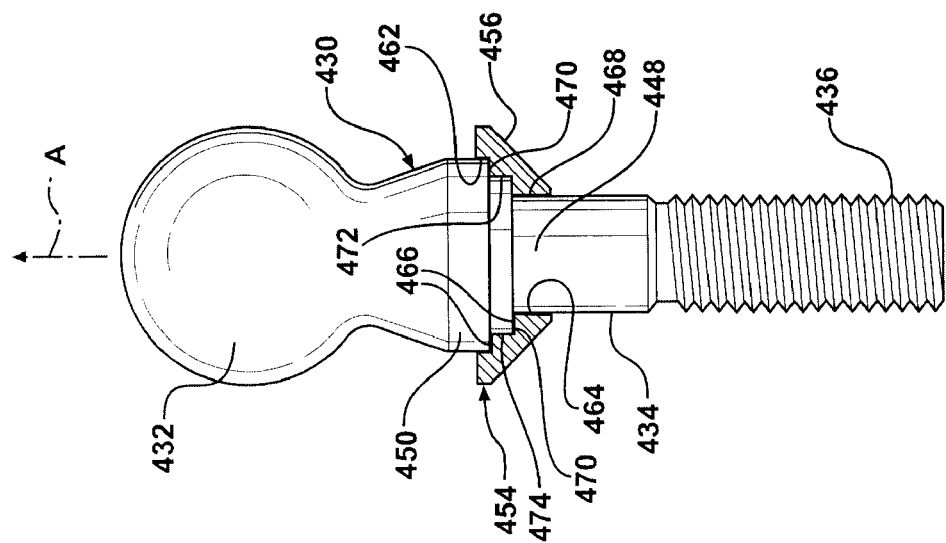
FIG. 8 is a view as in FIG. 3 but illustrating a fourth alternative embodiment of the abutting surface-to-surface contact region between the adaptor and the stud.

FIG. 8 depicts a fourth alternative embodiment of the subject invention wherein like or corresponding parts to those described above are reiterated but with the prefix "4" for convenience. In this example, a pair of progressively sized steps are machined or otherwise formed on the adaptor interface region 448, with complementary receiving shapes formed on the inner surface of the adaptor 454. More specifically, the interior surface of the adaptor 454 is shown herein including a generally cylindrical intermediate side wall 472 that is concentrically disposed relative to the major side wall 462 and thereby establishing an intermediate sized diameter. The intermediate side wall 472 bisects the shoulder 466 into plural segments. The adaptor interface region 448 of the shank 434 likewise includes a generally cylindrical intermediate shaft bisecting the shoulder 470 into plural segments. The intermediate shaft 474 matingly engages the intermediate side wall 472 of the adaptor 454. Thus, as can be seen upon consideration of FIG. 8, the multi-stepped configuration of the mating surfaces increases the integrity of fit between the adaptor 454 and the stud 430. Of course, additional steps can be incorporated into the design, as can combinations of steps together with the spheroidal curvatures depicted in FIGS. 2-6.

Obviously, many modifications and variations of the present invention are possible in light of the above teachings. For example, more steps can be formed in the interface portion, and the step configuration can be combined with spheroidal curvatures. It is, therefore, to be understood that the invention may be practiced otherwise than as specifically described.

What is claimed is:

1. A ball and socket joint assembly for use in vehicular steering and suspension applications in which an anchoring control member is incorporated, said assembly comprising:

a stud having a ball portion terminating at a substantially spherical surface on one end thereof and a shank extending therefrom, said shank including a thread form for attaching said stud to the anchoring control member;

said shank including an adaptor interface region unitarily formed with and between said ball portion and said thread form;

an annular, loose piece adaptor constructed of a single piece of material slidably disposed on said shank and matingly engaging said adaptor interface region in abutting surface-to-surface contact therewith, said adaptor having an interior surface and a frustoconical exterior surface tapering inwardly toward said thread form configured to seat with a complimentary shaped flare of the anchoring member; and said interior surface of said adaptor including a generally spheroidal female surface configuration and said adaptor interface region of said shank having a complementary-shaped generally spheroidal male surface configuration, whereby the generally spheroidal female and male mating surfaces abut in surface-to-surface contact with one another to provide enhanced stress distributions and load carrying capabilities with less adaptor-to-shank slippage in operation.

2. The assembly as set forth in claim 1 wherein said generally spheroidal female surface configuration on said adaptor has a generally convex formation, and said mating generally spheroidal male surface configuration on said adaptor interface region has a generally concave formation.

3. The assembly as set forth in claim 1 wherein said interior surface of said adaptor includes a generally cylindrical side wall adjacent said generally spheroidal female surface configuration, and said adaptor interface region of said shank includes a generally cylindrical collar between said spheroidal male surface configuration and said ball portion, said cylindrical collar being matingly received within said side wall of said adaptor.

4. The assembly as set forth in claim 1 further including a housing cap surrounding said ball portion of said stud and articulatable thereabout.

5. The assembly as set forth in claim 4 further including a resilient dust boot extending between said housing cap and said shank for preventing contaminant infiltration into the articulating interface.

* * * * *